July 19, 1960  E. L. JENSEN ET AL  2,945,651
AIRCRAFT CONTROL SURFACE INTERNAL AIR PRESSURE BALANCES
Filed July 11, 1955  3 Sheets-Sheet 1
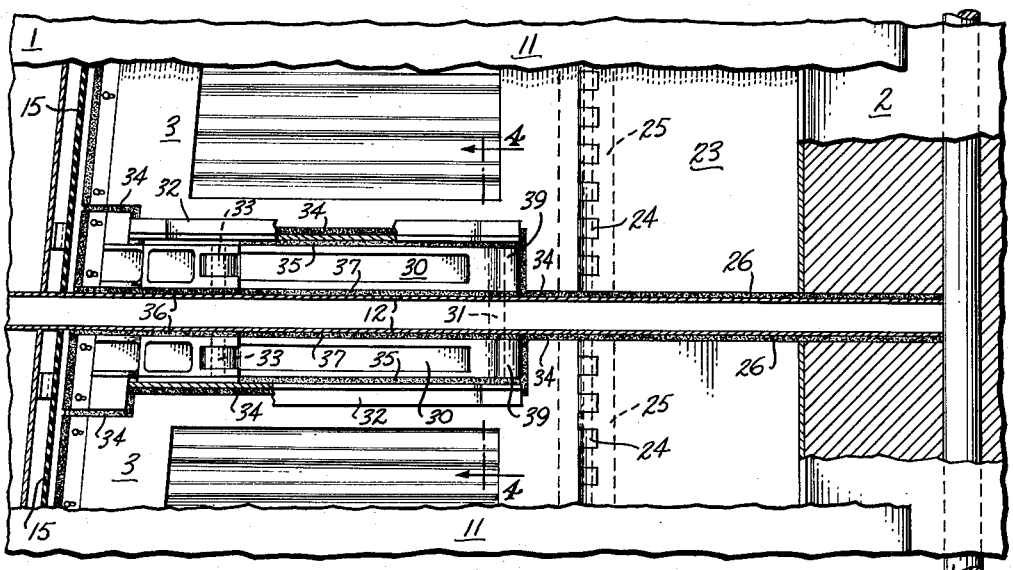
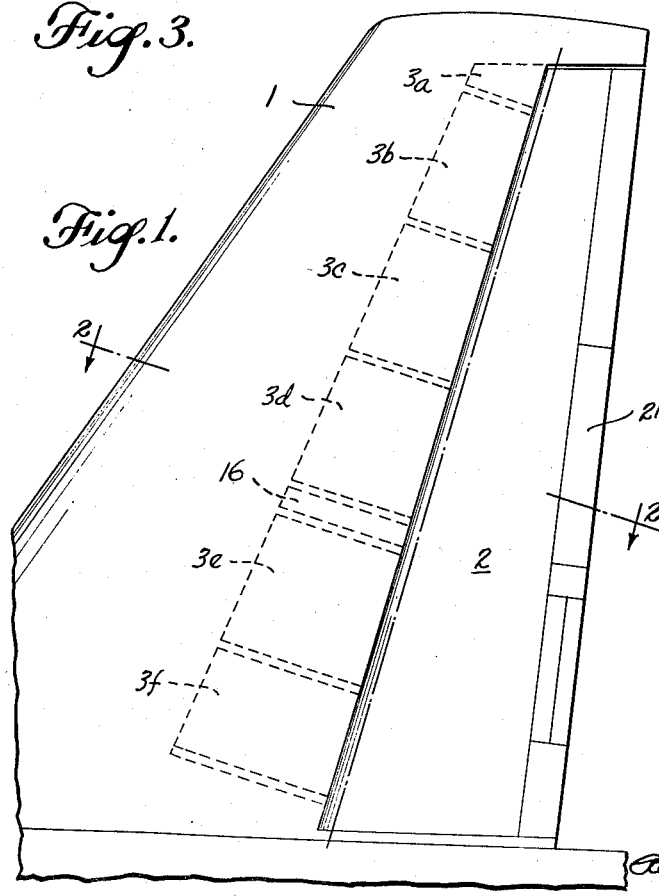
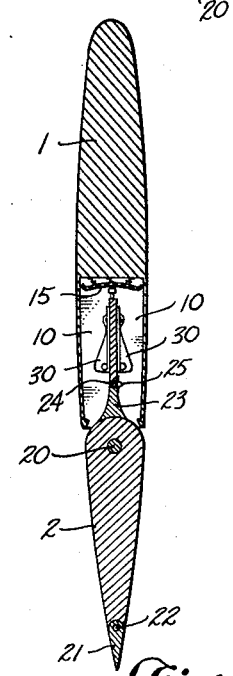
INVENTORS.
EARL L. JENSEN
REGINALD E. WASHINGTON
BY
Reynolds, Beach & Christensen
ATTORNEYS

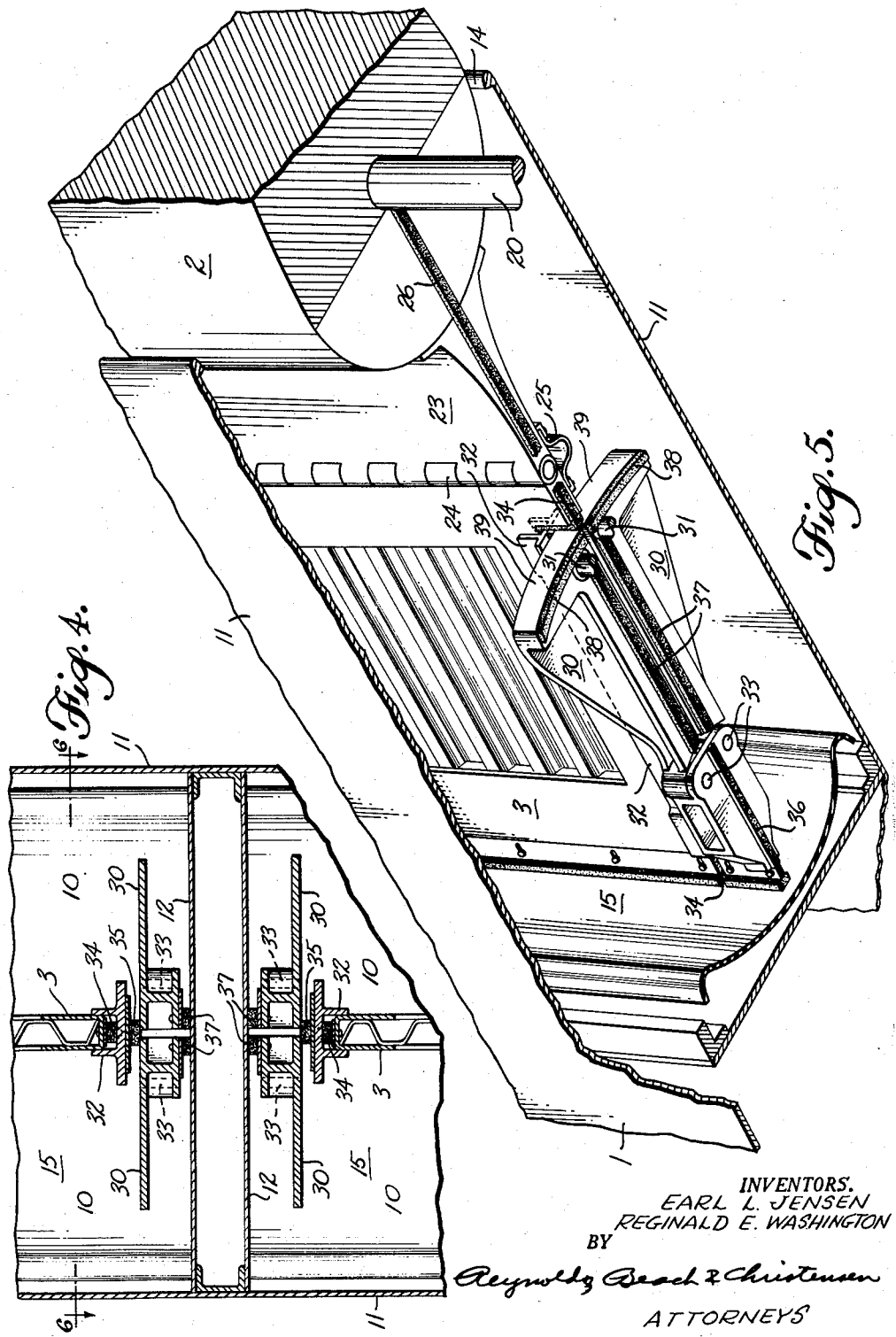

July 19, 1960   E. L. JENSEN ET AL   2,945,651
AIRCRAFT CONTROL SURFACE INTERNAL AIR PRESSURE BALANCES
Filed July 11, 1955   3 Sheets-Sheet 3

INVENTORS.
EARL L. JENSEN
REGINALD E. WASHINGTON
BY
Reynolds, Beach & Christensen
ATTORNEYS United States Patent Office 2,945,651
Patented July 19, 1960

2,945,651

AIRCRAFT CONTROL SURFACE INTERNAL AIR PRESSURE BALANCES

Earl L. Jensen and Reginald E. Washington, Seattle, Wash., assignors to Boeing Airplane Company, Seattle, Wash., a corporation of Delaware Filed July 11, 1955, Ser. No. 521,162

14 Claims. (Cl. 244—90)

The present invention relates to an air pressure balance for an aircraft control surface which is of the internal type, namely one housed in the trailing portion of a stabilizer forward of the control surface.

A principal object of the present invention is to provide such an air pressure balance for a control surface which can be housed within a relatively thin stabilizer structure, and yet can be of unusually large area to produce a relatively great force to assist in swinging the control surface from neutral position without detracting from the streamlined form either of the stabilizer or of the control surface or of the combination of these members.

Another object is to provide such an internal control surface balance which can be installed in the trailing portion of a stabilizer in a manner such that the differential pressure on opposite sides of the control surface balance can be increased progressively as the control surface is swung farther from neutral position so as to lighten the control forces required to swing the control surface proportionately more at higher angles of attack of the control surface. In accomplishing this object it is also an object to seal reasonably tightly joints between movable balance elements and balance mounting elements and stationary structure of the stabilizer so as to reduce to a minimum leakage of air between most movable and stationary parts of the structure while controlling the opening of a single gap between a movable and a stationary element, so that the area of such gap will be reduced progressively as the control surface is swung farther from neutral position thus to increase correspondingly the differential in the air pressures acting on opposite sides of the balance.

A further object is to provide an air pressure balance which is not a fixed integral part of the control surface, but at least a portion of which is movable relative to the control surface, and to guide movement of the balance so that its movement is coordinated properly with movement of the control surface as the latter swings from neutral position.

It is also an object to provide such balance structure which will be of simple and effective construction as well as light and compact, and which is easily removable.

In accomplishing these objects suitable mechanism includes a vane integral with and projecting from the leading edge of a pivoted control surface forwardly into the hollow trailing portion of a stabilizer, and a balance panel forward of such vane and having its trailing edge hingedly connected to the leading edge of the vane. Guide means, preferably in the form of movement controlling linkage, guide the balance panel for transverse movement as the control surface swings from its centered or neutral position. Preferably the balance panel is guided for movement by such guide means in a manner to restrict communication through an aperture between the chambers at opposite sides of the panel so that the farther the panel and the control surface move, the more restricted will be the communication between such chambers and consequently the greater will be the difference in air pressure on opposite sides of the balance panel and vane. A preferred type of construction incorporating these features is shown in the accompanying drawings.

Figure 1 is a side elevation view of an airplane vertical fin and rudder combination incorporating the present invention, and Figure 2 is a sectional view through such structure taken on line 2—2 of Figure 1.

Figure 3 is an enlarged side elevation view of part of the trailing edge portion of the fin and leading edge portion of the rudder with parts broken away to reveal internal structure. Figure 4 is a vertical transverse sectional view through the trailing portion of the vertical fin taken on line 4—4 of Figure 3.

Figure 5 is a bottom perspective view showing a portion of the interior of the trailing portion of the vertical fin and part of the leading edge portion of the control surface and balance mechanism.

Figure 6:
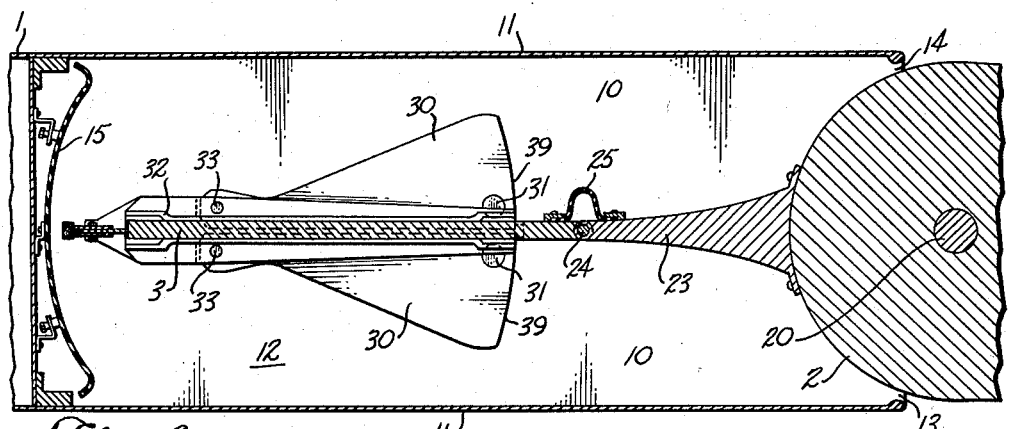
Figure 6 is a substantially horizontal sectional view through the trailing portion of the vertical fin and the leading portion of the rudder taken on line 6—6 of Figure 4, showing parts in the neutral position.

As mentioned, the drawings illustrate the application of the present invention to a vertical fin and rudder combination of an airplane, but it should be understood that this is simply a representative application. The same principles can be applied and similar construction utilized in a horizontal stabilizer and elevator combination or even in an airplane wing and aileron combination. For that reason the normally stationary stabilizing or lifting airfoil surface forward of the control surface will in the following description be designated a stabilizer, and the rudder, elevator or aileron will be designated generally a pivoted control surface. Since the vertical fin and rudder installation is a typical combination of stabilizer and control surface to which the present invention is adaptable, however, this particular type of installation has been selected as being representative.

As shown in Figures 1 and 2, the present invention is applied to a combination of a stabilizer 1 and a control surface 2 swingably supported by a pivot rod 20 carried by the stabilizer in which the stabilizer is relatively thin, which is true of high speed airplanes. In such airplanes it is much more important than in low speed airplanes that the combination of the stabilizer and the swingable control surface have a fair or streamlined contour in all swung positions of the control surface relative to the stabilizer. Particularly for large airplanes, however, it is also desirable than whenever possible aerodynamic assistance be provided to aid in swinging the control surface relative to the stabilizer.

In the particular vertical fin and rudder combination selected for illustration, swinging of the rudder relative to the vertical fin can be accomplished by direct application of pilot force to the rudder mechanism and without the assistance of power mechanism. This type of operation is facilitated partially by employing a control tab 21 swingably mounted on the trailing edge of the rudder by pivot rod 22 to effect swinging of the rudder relative to the vertical fin. The size of such a control tab can be materially reduced, however, if the aerodynamic forces acting on opposite sides of the rudder are fairly nearly balanced about its hinge axis defined by the pivot rod 20. It will be evident that the general construction of the vertical fin and of the rudder is shown quite diagrammatically in Figures 1 and 2.

The effect of the present invention is to enable the aerodynamic forces on the control surface fore and aft of the axis of pivot rod 20 to be fairly nearly balanced by utilization of an internal type of nose balance mechanism housed within the hollow trailing portion of the stabilizer 1. Conventionally such internal nose balances utilize a vane integral with and extending forwardly from the leading edge of the control surface. The greater the chord of such vane forward of the pivot axis of the control surface in proportion to the chord of the control surface aft of such pivot axis, the greater will be the balancing force developed to assist swinging of the control surface.

In order to be able to produce control forces adequate to maneuver the airplane, however, and yet to avoid making the control surface area excessive, it is customary for the control surface to be designed to swing through a maximum angle of the order of twenty degrees to twenty-two degrees each side of the normal or centered position. Particularly if a stabilizer of thin section is used it will be evident that the chord of a nose balance integral with the control surface must be small if the control surface is to be able to deflect from its centered position through an angle approximating twenty degrees. As shown in the drawings, in the typical control surface and stabilizer combination shown in Figures 1 and 2 a nose balance vane 23 integral with the leading edge of the control surface could have a chord forward of the pivot axis of the control surface equal only to about thirty percent of the chord of the control surface aft of the pivot axis if the control surface is to be able to swing through an angle of nineteen degrees, as illustrated in Figure 8, or more.

By utilizing the present invention, on the contrary, and without increasing the thickness of the stabilizer or altering its exterior conformation, an effective internal nose balance plate means can have a chord as shown in the drawings as much as sixty-eight percent of the portion of the control surface chord aft of its pivot axis, or even more if desired. It is preferred, however, that the effective chord of the nose balance plate means not be too great, so as to insure adequate trailing stability, both statically and dynamically, of the control surface in all deflected positions and under all conditions of air flow over the stabilizer and control surface combination. A nose balance plate arrangement having the proportions shown in the drawings relative to the portion of the control surface aft of the hinge line has proven to be satisfactory for a particular design.

To enable the effective chord of the control surface nose balance plate means to be as great as shown in the drawings and as discussed above, such nose balance plate means is articulated about a hinge axis extending substantially parallel to the pivot axis of the control surface. Such articulated nose balance plate means includes the vane 23 integral with the leading edge of the control surface 2, and consequently swingable with it, and a balance panel 3 disposed generally in a plane parallel to the chord of the stabilizer and having its trailing edge hingedly connected to the leading edge of the vane 23, preferably by a piano type hinge 24. While a hinge of this type would not permit much air leakage through it between the chambers 10 on opposite sides of the nose balance into which such balance divides the hollow in the trailing portion of the stabilizer 1 between its walls 11, it is preferred that such hinge joint be made virtually leak-proof by the addition of a strip 25 of flexible impervious material spanning the hinge connection, as shown best in Figures 6, 7 and 8.

Figure 7:
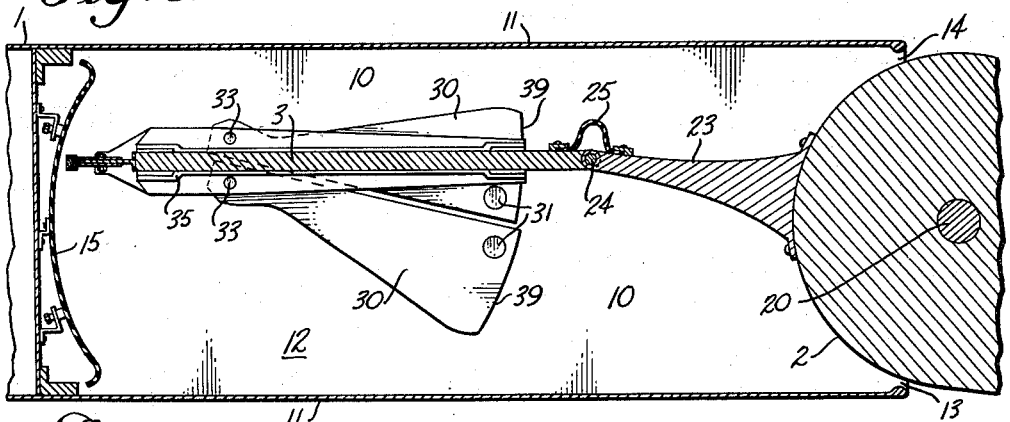
Figure 7 is a similar view showing the parts in an intermediate deflected position.
Figure 8:
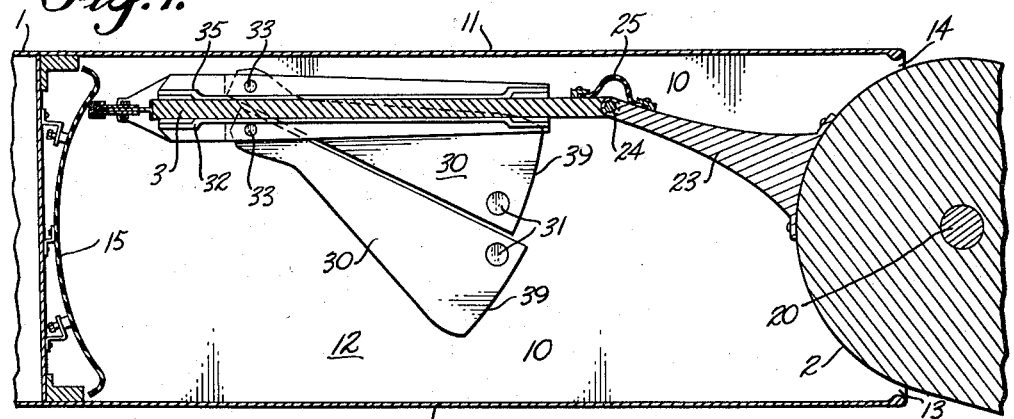
Figure 8 is a similar view showing parts in fully deflected position.

Because the balance vane 23 is integral with the control surface 2 it is evident that this vane will swing simultaneously with deflection of the control surface from its centered or neutral position and to the same angular extent, as shown in Figures 7 and 8. Because of the hinge joint between the leading edge of this vane and the trailing edge of the balance panel 3, the trailing portion of such balance panel will of necessity be shifted simultaneously and to the same degree as the leading edge of the vane 23 moves during swinging of the control surface. Since the panel 3 and the vane 23 are relatively swingable about the axis of hinge 24, however, swinging of the control surface and vane 23 effects no control over the angular relationship between the balance panel 3 and the vane 23. Consequently, suitable guide means must be provided to control the angular position of the balance panel 3 as its trailing edge is shifted by swinging of the balance vane and control surface.

The articulation afforded by the hinge 24 of the parts of the nose balance enables the differential in pressures on opposite sides of the balance over the entire area of the articulated balance to exert a force on the leading edge of the vane 23 tending to swing such vane where the pressure on the concave side of the articulated balance is greater than the pressure on its convex side. It is not necessary, therefore, that the articulated balance plate means be composed of only two parts, but it could include a larger number of articulated sections. The problem of providing suitable guide means to control the shifting of the sections forward of the vane integral with the control surface is simplified, however, if the nose balance plate means incorporates only a single panel in addition to the vane integral with the control surface.

The importance of the articulated feature is to enable that portion of the nose balance plate means ahead of the vane 23 integral with the control surface to remain within the confines of the hollow in the trailing portion of the stabilizer 1 defined by its walls 11. Consequently, instead of panel 3 swinging through an angle equal to the angle of swing of the vane 23 and the control surface, such panel must be guided to swing through a smaller angle of deflection or be restrained completely from swinging as the control surface moves. Instead of swinging as much as the control surface, or at all, the balance panel 3 preferably is translated in a direction transversely of its plane instead of being swung appreciably. Consequently, for all swung positions of the control surface the balance panel 3 will be disposed substantially parallel to the chord of the stabilizer 1.

While the guide means employed to guide movement of the balance panel 3 in this fashion could incorporate suitable slides and guideways, it is preferred that the guide means be of the pivoted link type incorporating link means having one end fixedly pivoted to a longitudinal bulkhead 12 of the stabilizer and the other end pivotally guiding an adjacent edge of the balance panel 3. Preferably the linkage means are connected to the stabilizer by the fixed pivot means at a location aft of the pivot between such linkage means and the panel or the panel engaging structure.

In the example shown in the drawings the means for guiding shifting of the balance panel 3 transversely of its plane include a pair of mated substantially parallel links 30, the aft ends of which are connected respectively to the stabilizer bulkhead 12 by stationary pivots 31. The forward ends of these links are connected by the movable pivots 33 to a channel member 32 receiving one edge of the panel 3. Swinging of the links 30 guides translation of the panel engaging channel 32. The pivots 33 are connected to the panel engaging channel rather than directly to the panel 3 so that the panel may be slid freely out of such guide channels when the control surface is removed. The panel 3 and channel 32 will have slight relative fore and aft movement as the control surface is swung if the effective length of the linkage means and the effective length of vane 23 are not equal.

More specifically, in the particular mechanism illustrated in the drawings the distance between the axes of pivots 31 and 33 is somewhat less than the distance between the axes of control surface hinge 20 and the articulating hinge 24 connecting the vane 23 and the balance panel 3. Consequently, as the control surface swings through a given angle to either side of the neutral position shown in Figure 6, the pivots 33 will move aft somewhat farther than hinge 24. Such movement differential could be accommodated by allowing pivots 33 to move in slots provided directly in the edge of panel 3, but it is preferred to engage such panel edge slidably in the channel 32 to which the pivots 33 are connected in nonslidable relationship. The panel can then slide relative to the channel 32 during swinging of the control surface, to compensate for the discrepancy in fore and aft movement of hinge 24 and pivots 33 as discussed above. Moreover, the panel can be slid completely out of the channel while connected to the control surface as the control surface is removed.

Utilization of substantially parallel links 30 will insure that the channel 32 is maintained always in a position substantially parallel to the chord of the stabilizer 1 as it is shifted from its central position whether or not the balance panel 3 is engaged in the channel. If pivots 33 are spaced slightly farther apart than pivots 31 the leading end of the channel will toe inward slightly as it swings. Sufficient guiding of the balance panel translation could be accomplished by use of only one of links 30 if the distance between its pivots 31 and 33 were approximately equal to the distance between the axis of the control surface hinge line 20 and the axis of hinge 24 and pivot 33 were connected directly to the edge of the balance panel itself instead of to the guide channel. The panel could not be slid into and out of position in such case, however.

Because the balance panel 3 is freely translatable as the control surface swings, any force exerted on such balance panel by a difference in air pressure in the chambers 10 at its opposite sides will be transmitted directly to the vane 23 to assist swinging of the control surface, assuming that the pressure in the chamber at the concave side of the articulated nose balance is greater than the pressure in the chamber at its convex side. Such pressure difference will, of course, exert a correspondingly beneficial pressure on the vane 23. Consequently it is desirable to control the difference in air pressures in the two chambers 10 in order to obtain the desired control surface balancing characteristics.

Particularly for large control surfaces it is usually preferred that the difference in pressures on opposite sides of the nose balance increase as the deflection of the control surface increases so that a greater control surface movement assisting force will be produced at higher angles of attack of the control surface. Such control of the air pressures at opposite sides of the nose balance can be accomplished by controlling the communication between chambers 10.

As a control surface 2 is swung relative to a stabilizer 1, the air pressure at the concave side of the stabilizer and control surface combination increases and the air pressure at the convex side of the stabilizer and control surface combination decreases, and this phenomenon is especially pronounced adjacent to the pivot of the control surface where the alteration in curvature of the stabilizer and control surface combination occurs. Consequently, as the control surface is swung from its neutral position shown in Figure 6 to the deflected position shown in Figure 7, air will tend to flow between the control surface and the stabilizer through slot 13 into the hollow trailing portion of the stabilizer and out the slot 14 from such hollow. The nose balance 3, 23 consequently acts as a partition past which air must flow from the lower side of such nose balance as seen in Figure 7 to the upper side in order to permit appreciable flow of air into slot 13 and out slot 14. Such slot passages should be smoothly faired.

As the control surface is swung farther to the positions shown in Figure 8, the difference in the air pressures beneath the control surface and above the control surface will be greater, so that if the flow through the hollow of the stabilizer's trailing portion were unobstructed air would flow faster and in greater quantity into slot 13 and out of slot 14. To the extent that flow through the hollow of the stabilizer and around the nose balance is restricted, the difference in air pressure in chamber 10 at the concave side of the nose balance will increase over the air pressure in the chamber 10 at its convex side. While as mentioned the pressure difference at opposite sides of the control surface is greater for greater angles of deflection of the control surface, the difference in the air pressures at the opposite sides of the articulated nose balance 3, 23 may be increased to a greater extent if the passage between chambers 10 is more restricted for greater angles of control surface deflection. Normally such greater pressure difference is desirable.

In order to be able to predict and to control the flow of air from one chamber 10 to the other for various swung positions of the control surface it is preferable to seal as far as possible leakage between the articulated nose balance and the bulkheads of the stabilizer adjacent to opposite longitudinal edges of the nose balance and to provide only a passage between the leading edge of the balance panel 3 and a bulkhead 15 of the stabilizer 1. The contour of such bulkhead can then be designed relative to the locus of the leading edge of the balance panel 3 which it traces as the control surface swings in order to vary to the extent desired the restriction of the passage communicating between the chambers 10 at opposite sides of the nose balance, and such bulkhead may be adjustable.

To accomplish this purpose the bulkhead 15 will be formed as a cove having a radius of curvature less than the distance between the axis of the control surface pivot 20 and the axis of the hinge 24, which distance determines the locus of the leading edge of the balance panel 3 if the guide means restricts movement of the balance panel to true translation. The center of the cove 15 will then be selected so that when the control surface and balance panel 3 are in their neutral positions, as shown in Figure 6, the gap between the cove and the leading edge of the balance panel will be of substantial width, whereas when the control surface has swung to its position of full deflection shown in Figure 8, the curvature of the cove and of the locus of the leading edge of balance panel 3 will have intersected so that the gap has closed. With the parts in this position, therefore, the difference in air pressures in the two chambers 10 will be maximum for the particular air speed of the airplane. Between these two extreme positions, such as in the intermediate position represented by Figure 7, the passage between the cove 15 and the leading edge of the panel 3 will be more restricted than when the control surface and balance panel are in their neutral positions shown in Figure 6, but the gap will not be closed completely as shown in Figure 8 so that some flow through this gap will occur. Both the curvature and position of the cove can be altered, and the projection of the panel nosing can be varied, to provide the desired gap in each swung position of the control surface.

In order to facilitate control of the flow of air from one chamber 10 to the other through the gap at the leading edge of the balance panel 3, it is desired that the joints between the edges of such panel and longitudinal bulkheads 12 of the stabilizer be sealed as tightly as possible. Sealing structure for this purpose is shown best in Figures 3, 4 and 5, which is provided between all relatively movable parts except the panel's leading edge and cove 15. The type of seal preferred is a yieldable rubbing strip engaging a hard surface. In each instance, instead of a single rubbing strip being used, two or more parallel strips may be employed if desired. Mohair strips provide satisfactory seals.

Particularly where the control surface has rather a long span as shown in Figure 1, it is preferred that the nose balance be divided into a plurality of sections along the length of the control surface. In the particular rudder installation illustrated the nose balance is shown in broken lines to be divided into six sections, 3a, 3b, 3c, 3d, 3e and 3f, leaving a space 16 between sections 3d and 3e, through which control cables may extend to a tab or tabs on the trailing edge of the control surface. Bulkheads 12 of the stabilizer 1 are located adjacent to opposite ends of each nose balance section and the sealing arrangement at opposite ends of each such section may be similar, as well as the sealing arrangement being similar from section to section. Consequently it is only necessary to describe the particular sealing arrangement between one end of one nose balance section and the adjacent stabilizer bulkhead 12.

At the aft end of the hollow in the trailing portion of the stabilizer 1, the leading edge of the control surface 2 and the vane 23 project forwardly into such hollow. Since these two parts are integral, a rubbing strip seal 26, shown in Figure 5, may extend from the control surface pivot rod 20 to the axis of hinge 24, which will effect a seal between the bulkhead 12 and the ends of these parts. Forward of hinge 24 the rearmost portion of the longitudinal edge of balance panel 3 extends to a location adjacent to the bulkhead 12 relative to which it moves principally transversely of the stabilizer as the control surface swings, but to some extent longitudinally of the stabilizer. Also, as discussed previously, when the guide means incorporates parallel linkage of an effective length different from the spacing between the axes of control surface pivot 20 and hinge 24 some relative movement will occur between the edge of panel 3 and its grooved engaging member or channel 32 lengthwise of such channel. A rubbing strip seal may therefore be provided between these parts preferably being secured to the edge of the balance panel 3.

As shown best in Figures 7 and 8, relative movement occurs between the balance panel guiding linkage means 30 and such panel 3 or the panel engaging member 32 and a sealing arrangement must be provided which will be effective in all swung positions of the control surface, and particularly when it is at high angles of attack. To enable the linkage means to be sealed relative to the panel means in all swung positions of the control surface, each link 30 is tapered from its fixedly pivoted end toward its swingable end. The tapered parallel links are thus of inversely congruent, substantially triangular shape and the fixed pivots 31 are in adjacent corners of the links. To whichever side of neutral position the control surface is swung, therefore, the rubbing strip seal 35 on channel 32, shown in Figure 4, will rub on one of the links.

The portion of the panel engaging channel 32 forward of pivots 33, as shown in Figure 5, has a thickened web extending spanwise to a location adjacent to a longitudinal bulkhead 12. A seal between the thickened channel web and the bulkhead is effected by the rubbing strip seal 36. The portions of the links 30 adjacent to the bulkhead 12 carry rubbing strip seals 37 extending linearly along the adjacent edges of the links substantially between the pivots 31 and 33. Also, in order to establish a firm bearing for the links when the control surface is swung to high angles of attack, as well as to provide sealing means closely adjacent to the aft portion of seal strip 34, seal strips 38 are provided extending laterally and oppositely from pivots 31 on the lower surfaces of the links 30 along their aft ends.

As the control surface 2 swings relative to the stabilizer 1, a shoulder near the aft end of the balance panel 3 moves adjacent to one or the other of arcuate ends 39 of the respective parallel links 30. In order to enable a portion of the seal strip 34 shown in Figure 5 to rub on such a link end surface, the radius of curvature of each such surface must be slightly less than the distance from such surface to pivot 33 because, as shown by comparison of Figures 6 and 8, for example, the aft edge of panel 3 moves slightly forward relative to pivots 33 as the links 30 swing.

As has been mentioned previously, leakage of air through hinge 24 preferably is prevented by bridging it with an impervious seal strip 25. The balance panel 3 itself is impervious to passage of air through it. For lightness this panel may, as shown in Figures 4 and 5, be composed of a corrugated central portion set in a channel frame.

We claim as our invention:

1. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, means on said stabilizer supporting said balance panel independently of said vane and said control surface, hinge means interconnecting the trailing edge of said balance panel and the leading edge of said vane, and means interengaged between said stabilizer and said balance panel independently of said vane and said control surface and guiding said balance panel for movement transversely thereof within said stabilizer as said control surface swings about its pivot, said hinge means being operable to transmit force from said balance panel to said vane produced by a difference in air pressures on opposite sides of said balance panel.

2. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, and parallel linkage means located forward of said hinge means, interconnecting said stabilizer and said balance panel independently of said vane and said control surface, guiding said balance panel for translative movement transversely thereof within said stabilizer and operable to maintain said balance panel always substantially parallel to the chord of said stabilizer as said control surface swings about its pivot, said hinge means being operable to transmit force from said balance panel to said vane produced by a difference in air pressures on opposite sides of said balance panel.

3. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, two parallel links, two fixed pivots on said stabilizer located forwardly of said control surface and pivotally supporting said links from said stabilizer independently of said vane and said control surface, and pivot means operatively interconnecting said links and said balance panel and cooperating with said vane to guide said balance panel for movement transversely thereof within said stabilizer as said control surface swings about its pivot, said hinge means being operable to transmit force from said balance panel to said vane produced by a difference in air pressures on opposite sides of said balance panel.

4. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, two parallel links, two fixed pivots on said stabilizer located forwardly of said control surface and pivotally suporting the aft ends of said links from said stabilizer independently of said vane and said control surface, and pivot means operatively interconnecting the forward ends of said links and said balance panel and cooperating with said vane to guide said balance panel for movement transversely thereof within said stabilizer as said control surface swings about its pivot, said hinge means being operable to transmit force from said balance panel to said vane produced by a difference in air pressures on opposite sides of said balance panel.

5. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, two inversely congruent parallel links tapered lengthwise correspondingly, two fixed pivots on said stabilizer located forwardly of said control surface and pivotally supporting the aft ends of said links from said stabilizer independently of said vane and said control surface, pivot means operatively interconnecting the forward ends of said links and said balance panel and cooperating with said vane to guide said balance panel for movement transversely thereof within said stabilizer as said control surface swings about its pivot, said hinge means being operable to transmit force from said balance panel to said vane produced by a difference in air pressures on opposite sides of said balance panel, and seal means interengaged between said tapered links and said balance panel.

6. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, two inversely congruent parallel links of generally triangular shape tapered forwardly correspondingly having their lengths extending chordwise of said stabilizer, fixed pivots at adjacent corners of said links pivotally supporting the aft ends of said links from said stabilizer independently of said vane and said control surface, pivot means operatively interconnecting the forward ends of said links and said balance panel and cooperating with said vane to guide said balance panel for movement transversely thereof within said stabilizer as said control surface swings about its pivot, said hinge means being operable to transmit force from said balance panel to said vane produced by a difference in air pressures on opposite sides of said balance panel, and seal means interengaged between said tapered links and said balance panel.

7. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, a link, a fixed pivot on said stabilizer pivotally supporting the aft end of said link from said stabilizer, and pivot means operatively interconnecting the forward end of said link and the forward portion of said balance panel and cooperating with said vane to guide said balance panel for movement transversely thereof within said stabilizer as said control surface swings about its pivot, said hinge means being operable to transmit force from said balance panel to said vane produced by a difference in air pressures on opposite sides of said balance panel.

8. In aircraft control mechanism, a stabilizer having a hollow trailing portion, a control surface pivotally supported behind said stabilizer and having a vane extending forward therefrom into the hollow trailing portion of said stabilizer, balance panel means received within the hollow trailing portion of said stabilizer, hinge means interconnecting the trailing edge of said balance panel means and the leading edge of said vane, a link having its length extending chordwise of said stabilizer and tapered lengthwise forwardly, a fixed pivot on said stabilizer forward of said vane guiding the aft end of said link for rotation relative to said stabilizer, pivot means interconnecting the forward portion of said link and the forward portion of said balance panel means and cooperating with said vane to guide said balance panel means for movement transversely thereof within said stabilizer as said control surface swings about its pivot, and seal means interengaged between said balance panel means and said tapered link to deter passage of air between said balance panel means and said link, said hinge means being operable to transmit force from said balance panel means to said vane produced by a difference in air pressures on opposite sides of said balance panel means.

9. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, grooved members respectively engaging opposite longitudinally edges of said balance panel and slidable relative thereto, and means guiding said grooved members for movement transversely thereof within said stabilizer as said control surface swings about its pivot, said hinge means being operable to transmit force from said balance panel to said vane produced by a difference in air pressures on opposite sides of said balance panel.

10. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, grooved members respectively engaging opposite longitudinal edges of said balance panel and slidable relative thereto, a pair of parallel links disposed between each of said grooved members and said stabilizer, fixed pivots pivotally supporting from said stabilizer corresponding ends of the links of each pair, and pivot means operatively interconnecting the other ends of the links of each pair and the corresponding grooved member and operable to guide such grooved member for movement transversely thereof within said stabilizer as said control surface swings about its pivot, said hinge means being operable to transmit force from said balance panel to said vane produced by a difference in air pressures on opposite sides of said balance panel.

11. In aircraft control mechanism, a stabilizer having a hollow trailing portion, a control surface pivotally supported behind said stabilizer and having a vane extending forward therefrom into the hollow trailing portion of said stabilizer, a balance panel received within the hollow trailing portion of said stabilizer, hinge means interconnecting the trailing edge of said balance panel and the leading edge of said vane, grooved members respectively engaging opposite longitudinal edges of said balance panel and slidable relative thereto, a pair of parallel links similarly tapered and disposed between each of said grooved members and said stabilizer, fixed pivots pivotally supporting from said stabilizer corresponding wide ends of the links of each pair, pivot means operatively interconnecting the narrow ends of the links of each pair and the corresponding grooved member and operable to guide such grooved member for movement transversely thereof within said stabilizer as said control surface swings about its pivot, and seal means interposed between each grooved member and the pair of links adjacent thereto, said hinge means being operable to transmit force from said balance panel to said vane produced by a difference in air pressures on opposite sides of said balance panel.

12. In aircraft control mechanism, a stabilizer having a hollow trailing portion, a control surface pivotally supported behind said stabilizer and having a vane extending forward therefrom into the hollow trailing portion of said stabilizer, two channel members disposed substantially parallel, having their lengths extending chordwise of said stabilizer and their flanges extending toward each other, a balance panel received within the hollow trailing portion of said stabilizer and having opposite edges thereof slidably received within said respective channel members, hinge means interconnecting the trailing edge of said balance panel and the leading edge of said vane, a pair of inversely congruent parallel links of generally triangular shape, tapered lengthwise correspondingly and disposed at the side of each of said channel members remote from said balance panel, fixed pivots at adjacent corners of the links of each pair pivotally supporting the aft ends of the links of such pair from said stabilizer, and a pivot carried by the swinging end of each link and connected to one of said channel members for effecting a parallel linkage support for each of said channel members guiding the same for movement transversely thereof within said stabilizer as said control surface swings about its pivot and moving said balance panel translatively, the aft end of each of said channel members terminating adjacent to the aft ends of the links connected thereto and said balance panel being shouldered at the aft end of each of said channel members and including portions projecting oppositely into overlapping relation with the aft ends of the links of said respective pairs, the aft ends of said links being of arcuate shape conforming to the locus of movement of said respective balance panel shoulders as said control surface swings about its pivot.

13. In aircraft control mechanism, a stabilizer having a hollow trailing portion, a control surface pivotally supported behind said stabilizer and having a vane extending forward therefrom into the hollow trailing portion of said stabilizer, two channel members disposed substantially parallel, having their lengths extending chordwise of said stabilizer and their flanges extending toward each other, a balance panel received within the hollow trailing portion of said stabilizer and having opposite edges thereof slidably received within said respective channel members, hinge means interconnecting the trailing edge of said balance panel and the leading edge of said vane, a pair of inversely congruent parallel links of generally triangular shape, tapered lengthwise correspondingly and disposed at the side of each of said channel members remote from said balance panel, fixed pivots at adjacent corners of the links of each pair pivotally supporting the aft ends of the links of such pair from said stabilizer, a pivot carried by the swinging end of each link and connected to one of said channel members for effecting a parallel linkage support for each of said channel members guiding the same for movement transversely thereof within said stabilizer as said control surface swings about its pivot and moving said balance panel translatively, seal means engaged between each of said channel members and the edge of said balance panel received therein, seal means engaged between each of said channel members and the pair of links guiding the same for movement, the aft end of each of said channel members terminating adjacent to the aft ends of the links connected thereto and said balance panel being shouldered at the aft end of each of said channel members and including portions projecting oppositely into overlapping relation with the aft ends of the links of said respectively pairs, the aft ends of said links being of arcuate shape conforming to the locus of movement of said respective balance panel shoulders as said control surface swings about its pivot, and seal means interengaged between said respective shoulders and the arcuate ends of the adjacent links.

14. In aircraft control mechanism, a stabilizer having a hollow trailing portion, a control surface pivotally supported behind said stabilizer, a nose balance including articulated plate means connected to the leading edge of said stabilizer and extending forward therefrom into the hollow trailing portion of said stabilizer, means on said stabilizer supporting a portion of said articulated plate means independently of said control surface for movement within said stabilizer, means guiding said independently supported portion of said articulated plate means for movement relative to said control surface to one side or the other of a neutral position as said control surface swings about its pivot to one side or the other of a neutral position, and means subjecting the opposite sides of said articulated plate means to differential air pressure when said independently supported portion of said articulated plate means is in a position displaced from its neutral position.

References Cited in the file of this patent

UNITED STATES PATENTS

| | | |
|---|---|---|
| 2,421,374 | Diehl | June 3, 1947 |
| 2,603,436 | Mellinger | June 15, 1952 |
| 2,720,368 | Payne | Oct. 11, 1955 |

FOREIGN PATENTS

| | | |
|---|---|---|
| 643,297 | Great Britain | Sept. 15, 1950 |